United States Patent [19]

Dionisio et al.

[11] Patent Number: 4,957,150
[45] Date of Patent: Sep. 18, 1990

[54] LINEAR TIRE

[76] Inventors: Louis A. Dionisio, 750 S. Pecan St., Lindenhurst, N.Y. 11757; Philip Dionisio, 228 Bayview Dr., Mastic Beach, N.Y. 11951

[21] Appl. No.: 299,907

[22] Filed: Jan. 23, 1989

[51] Int. Cl.$^5$ ............................ B60C 5/00; B60C 3/04
[52] U.S. Cl. .................................... 152/454; 152/397; 152/514; 152/DIG. 8; 152/DIG. 18; 152/450
[58] Field of Search .................... 152/1, 5, 7, 8, 9, 10, 152/155, 300, 302, 305, 306, 310, 323, 329, 375, 378 R, 379.3, 383, 387, 388, 389, 390, 391, 392, 396, 397, 450, 514, 539, 548, 544, DIG. 8, DIG. 15, DIG. 18, 177, 208, 209 WT, 165; 301/5 R, 5.7; 29/113.1, 113.2

[56] References Cited

U.S. PATENT DOCUMENTS

| 1,293,528 | 2/1919 | Palmer | 152/209 WT |
| 2,237,819 | 8/1937 | Hawkinson | 152/454 |
| 2,698,042 | 12/1954 | Perkins | 152/544 |
| 3,169,581 | 2/1965 | Cummins | 152/9 |
| 3,237,675 | 3/1966 | Fisher | 152/397 |

Primary Examiner—Michael W. Ball
Assistant Examiner—Gregory J. Wilber
Attorney, Agent, or Firm—Leonard Belkin

[57] ABSTRACT

A linear tire and wheel assembly comprising a hub having spaced flanges on which are mounted an inner tube surrounded by a jacket over which a tire casing is mounted so that inflation of the inner tube results in the formation of a tire mounted on said hub. The jacket is made of flexible material which takes a predetermined shape when enlarged by the inflation of the inner tube. Air under pressure is supplied through one of the flanges.

4 Claims, 3 Drawing Sheets

LINEAR TIRE

BACKGROUND OF THE INVENTION

This invention relates to a wheel and tire assembly and more particularly to a pneumatic wheel and tire assembly capable of virtually unlimited widths without the requirement of the integrated bead.

The pneumatic tire commonly in use today as seen on automobiles, trucks, bicycles and other vehicles is mounted on a rim. A bead, usually of metal, is encapsulated within the rubber or similar material along the exposed edge to make contact with the metal rim, with or without a tube. The bead is required to insure among other things that the tire remains on the rim during service, which sometimes can be rough. In addition, the tire usually incorporates layers of material, which can be rayon, a metal mesh, or other type of fabric to provide for adequate support for the rubber or other material making up the tire and to prevent tearing, ripping or shredding during usage. Furthermore, all of the preceding must be accomplished with a high degree of precision and with close tolerances to provide proper sealing.

The necessity to meet such construction requirements makes the ordinary tire a complex and expensive product to manufacture and consequently tires tend to be very expensive in the marketplace. In addition, these same requirements impose practical limitations on the size and load capacity of tires made according to the presently common tire design as described above. In certain situations, as for example, for loads of in the order of a million pounds or more, rather than increase the diameter to unmanageable proportions, the width of the tire can be increased to accomodate such a load. Under these conditions, the manufacture of such tires using technology now available render the cost and complexity prohibitive.

A variety of tire and wheel assembly designs are shown in U.S. Pats. Nos. 1,903,575, 1,966,397, 2,113,031, 2,435,186, 2,628,652, 3,645,315, and 4,732,198. None of the preceding patents shows or suggests the present invention.

SUMMARY OF THE INVENTION

In accordance with the present invention many of the problems associated with tires of current designs are avoided or ameliorated by having a tire and wheel assembly construction with an external bead not incorporated in the tire casing and layers which are assembled rather than integrated together as found in present tires. This invention is especially useful for tires of great width, for example, the linear tire to be defined below.

A preferred embodiment of the invention comprises a cylindrical axle supporting a pair of spaced collars across which is stretched the rubber casing making up the outer surface to the tire. Within the casing there is placed a jacket similarly overlapping the collars. The jacket is made of a suitable fabric or other material which forms the shape of the tire when inflated. Within the jacket similarly supported at the ends is a sheet of material forming the inner tube of the tire. Bands on the collars hold the layers in place and perform the function of the bead. Valving for the tire is through one of the collars.

In the arrangement just described, the separation distance of the collars determines the width of the tire. Since the layers overlapping the collars are merely sheets of material, the tire can be made as wide as desired without encountering any unusual or severe manufacturing problems or costs. Because of the ability to make simply and cheaply tires of extraordinary width it is possible to produce tires having tremendous weight carrying capabilities at a cost which would be far less than which would be required utilizing present designs In addition, with the present invention it is possible to make very small pneumatic tires utilizing very low air pressures so that the conventional valve may be dispensed with and the tires can be made sufficiently inexpensive to be used in roller skates providing improved comfort, more safety since there is better traction, and greater usefulness under rough pavement conditions.

When the width of the outer tire casing in contact with a riding surface exceeds twice the diameter of the casing when inflated then the tire is referred to herein as a linear tire.

It is thus a principal object of this invention to provide an improved pneumatic tire which is more economical to manufacture and is capable of carrying enormous loads.

Another object of this invention is an improved pneumatic tire capable of use under very low pressures and does not require the use of a complicated valve.

Other objects and advantages of this invention will become obvious from the following description of preferred embodiments of this invention.

DETAILED DESCRIPTION OF THE PREFERRED EMBODIMENTS

Figure 1:
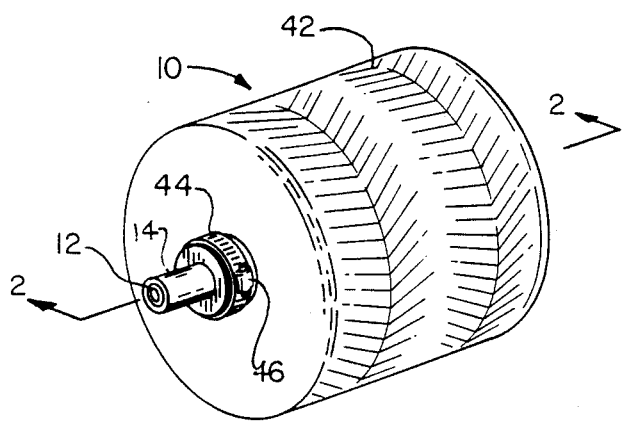
FIG. 1 is an isometric view of a tire incorporating the principles of this invention.
Figure 2:
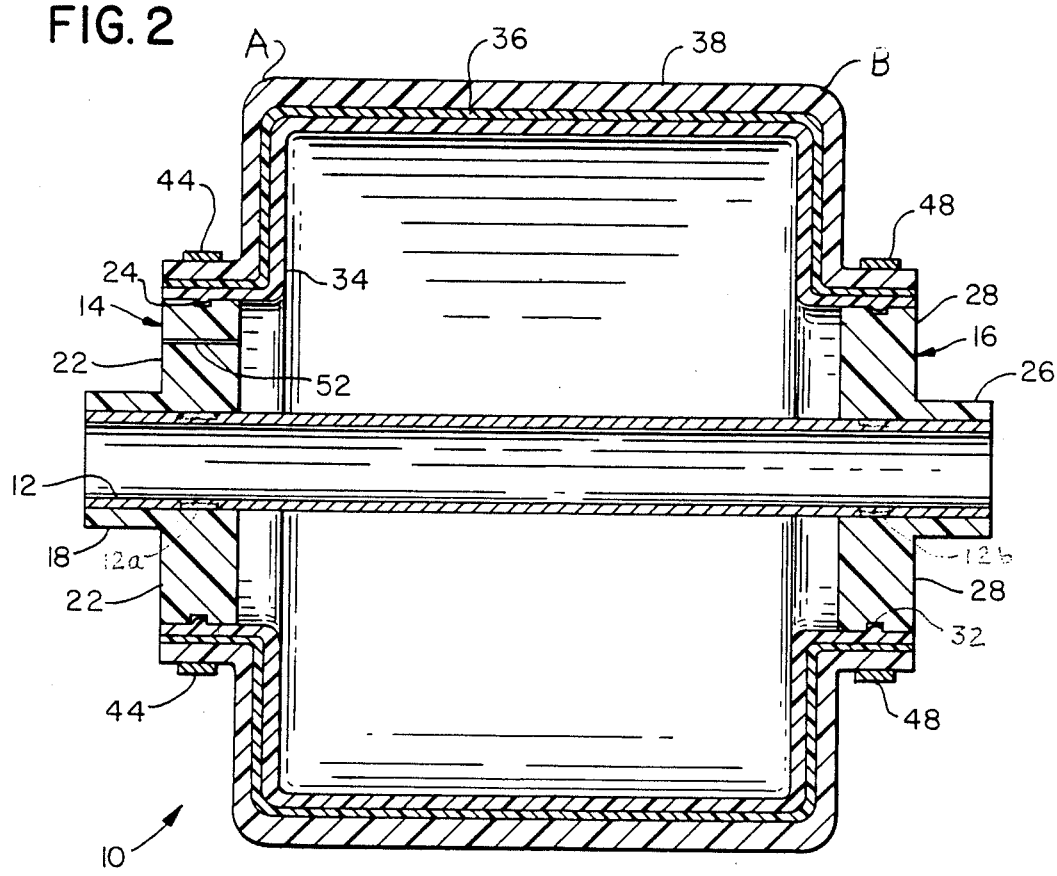
FIG. 2 is a sectional view along 2—2 of FIG. 1.
Figure 4:
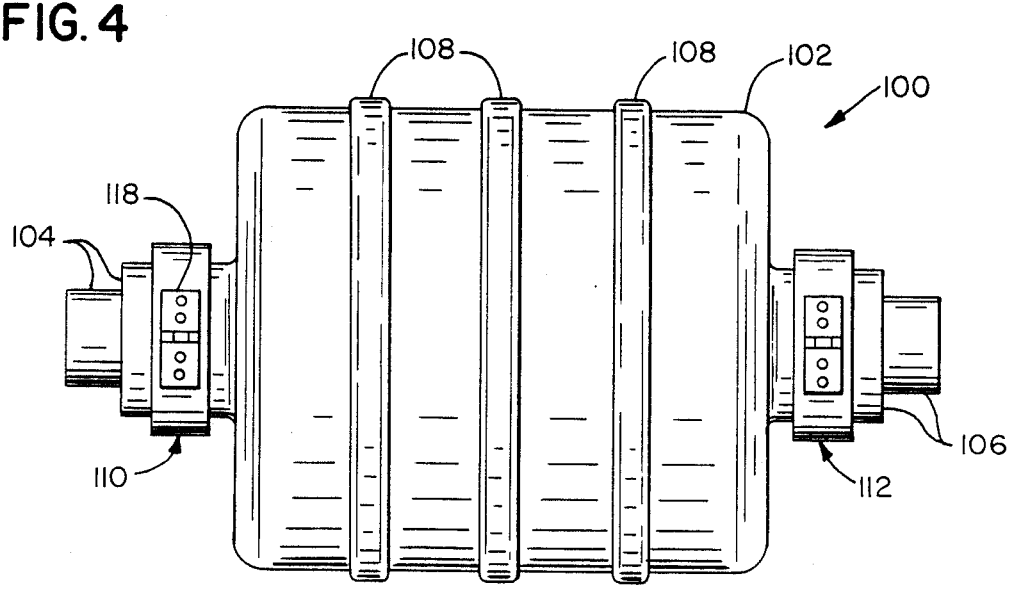
FIG. 4 is an elevation view of an alternative embodiment of this invention.
Figure 5:
FIG. 5 is a portion of a section along 5—5 of FIG. 6.

Referring to FIGS. 1 and 2 there is shown a linear tire and wheel assembly 10 incorporating the principles of this invention suitable for use under low pressures for low load conditions and capable of being sufficiently small in size to be useful in roller skates.

Assembly 10 consists of a hollow metal hub 12 on which is mounted a pair of spaced collars 14 and 16 made of rubber or a rubber-like synthetic material. As will be described below, provision may be made to prevent collars 14 and 16 from sliding on hub 12. With assembly 10 symmetrical as illustrated, collars 14 and 16 are identical to but mirror images of each other. Hub 12 may be provided with internal bearings (not shown) to support an axle (not shown) and may have end caps (not shown) to function as hub caps.

Collar 14 is made of a sleeve 18 and a flange 22 of larger diameter having a an annular groove 24 along the outer surface thereof as illustrated. Similarly, collar 16 has a sleeve 26 and a flange 28 with an annular groove 32.

Extending between and over flanges 22 and 28 are three layers consisting of an inner tube 34, a jacket or internal corset 36, and an outertire casing 38.

Inner tube or liner 34 is made of rubber or a synthetic rubber-like material capable of containing air under pressure. Tube 34 is shapeless by which is meant herein that it is capable of and will conform to the shape of jacket 36 as tube 34 is inflated.

Jacket 36 is any suitable flexible material such as a woven or unwoven fabric, made of natural or synthetic fibers, a rubberized metal or fiber glass mesh, or similar material which is pre-shaped and froms into its predetermined shape as inner tube 34 is inflated and expands jacket 36. The use of jacket 36 eliminates the need for molding. Also, jacket 36 predetermines the tire shape which is fixed by its pattern design and is non-elastic but pliable enough to yield to the pressure of its inner tube.

Outer tire casing 38 is a continuous sheet of rubber or synthetic rubber-like material having the physical characteristics to successfully carry out the function planned for it by which is meant that the tire casing 38, for example, may have treads 42 on the outside thereof if required, may contain other materials such as nylon or rayon to increase wear or puncture resistance, etc., and generally to function as a tire.

Wrapped around flange 22 is a metal band 44 directly over groove 24 which is tightened through any conventional means such as clamp 46 to insure that inner tube 36 is air tight and all of the layers, that is, inner tube 34, jacket 36, and outer tire casing 38 will remain in place. Metal band 44 and clamp 46 would be of conventional worm and teeth construction with clamp 46 having a screw with a slot to permit tightening of band 44 as is commonly used to tighten radiator hoses in autos. Flange 28 is provided with a similar metal band 48 and clamp (not shown). Metal bands 44 and 48 act like external beads allowing ease of manufacture and repair.

In order to prevent collars 14 and 16 from sliding sideways on hub 12, the latter may be provided with circumferential slots or grooves 12a and 12b under bands 44 and 48 so that as the latter are tightened, collars 14 and 16 will deform slightly to fill the grooves and thus lock collars 14 and 16 in place against sliding on hub 12. If desired, other provision may be made to prevent such movement, such as the use of lock washers, 0-rings, and any other means known in the art.

Figure 3:
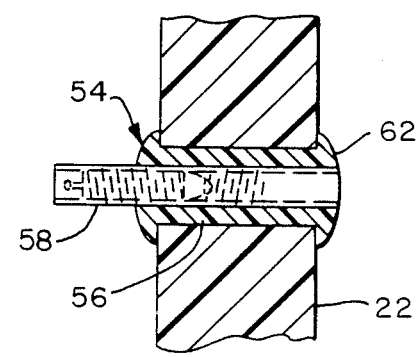
FIG. 3 is a detail of a portion of FIG. 2 showing the use of a conventional air valve.

To inflate assembly 10, there is provided through one of the collars, such as collar 14, a thin hole 52 through which would be inserted a needle valve (not shown) with band 44 loosened for injecting air under pressure. Upon reaching the proper inflation of inner tube 34, the needle is removed and band 44 tightened. As noted, this arrangement is for very low pressure applications, pressures in the order of up to about 10 psi. For pressures in excess of that pressure, instead of hole 52, as seen in FIG. 3, there would be provided a valve 54 of conventional type such as those used in bicycle and automobile tires but having a length and shape to fit through a hole 56 sized for such a valve. Valve 54 includes the metal cylinder 58 containing a spring loaded check valve encased in a rubber sleeve 62 with overlapping endcaps.

When the width of assembly 10, that is the distance between A and B in contact with a riding surface exceeds twice the diameter of the tire when inflated, then the tire herein is referred to as a linear tire.

For larger payloads where the use of collars of rubber construction may not be adequate, collars made of metal, or part metal and part rubber, may be employed. In such situations the collars may be welded, bolted, or threaded on the hub.

In addition, where the tire assembly is to be of extended width, for example, several feet in width for enormous load conditions, additional support may be required.

For an arrangement suitable for such applications, reference is made to FIGS. 4, 5, 6 and 7 where is shown a tire assembly 100 having a rubber outer tire casing 102 with rubber collars 104 and 106, identical in construction to the arrangement shown in FIGS. 1-3, except with the addition of retaining rings 108 on casing 102 and metal clamps 110 and 112 on collars 104 and 106 respectively.

Retaining rings 108 may be rubber straps, or metal such as steel coated with rubber to protect outer tire casing 102. Rings 108 may be mounted on tire assembly 100 when it is partially inflated or some provision may be made after inflation to tighten them such as the use of adjustable straps.

Clamps 110 and 112, which are identical, would be provided to insure adequate clamping under there extreme load conditions.

Figure 6:
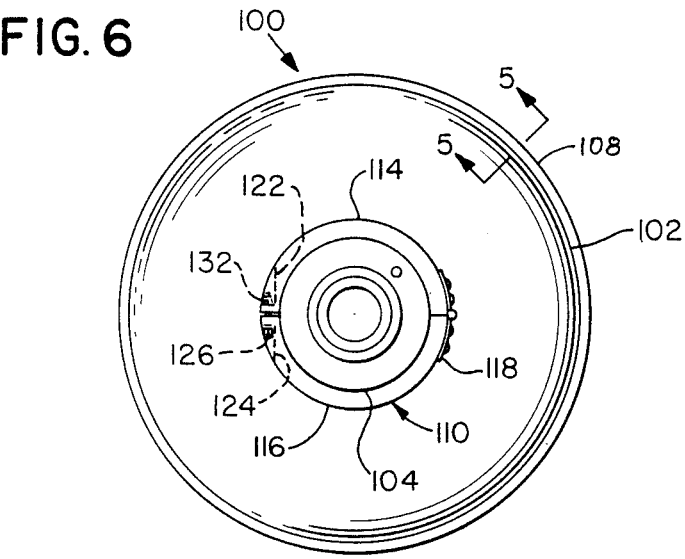
FIG. 6 is a left end view of the embodiment shown in FIG. 4.
Figure 7:
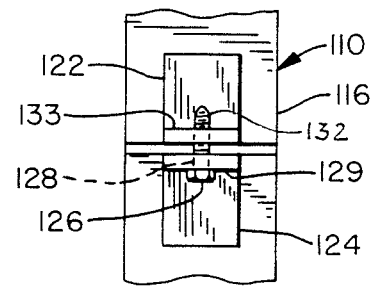
FIG. 7 is a left end view of a collar shown in FIG. 6.

As seen in FIGS. 6 and 7, clamp 110 consists of two semi-circular parts 114 and 116 connected with a hinge 118 on one side and provided with recesses 122 and 124 on the other side to accomodate a threaded bolt 126 to tighten down the open end of clamp 114. That is, bolt 126 passes through a hole 128 in wall 129 of part 116 to thread into a threaded hole 132 of wall 133 in part 116.

The purpose of using retaining rings 108 and clamps 110 and 112 is to accomodate the extreme load conditions, and prevent outer tire casing 102 from ballooning out. In addition, the use of rings 108 increases the speed at which the tires can be driven, as well as the width of tire which can be accomodated.

Under some circumstances, it may be desirable to provide a tire and wheel assembly which does not employ an inner tube. In that case the jacket would have to be made of material, impregnated with material, or coated with material which is capable of retaining air under pressure.

Figure 8:
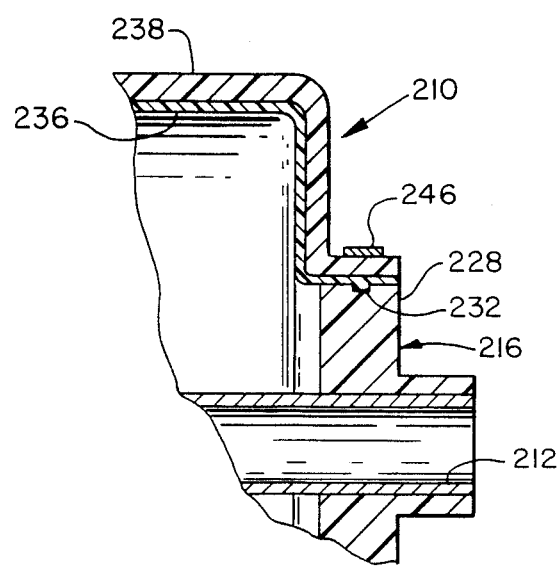
FIG. 8 is a section view similar to that of FIG. 2 showing one corner of an alternative embodiment.

Such a configuration is shown in FIG. 8. There is illustrated an assembly 210 corresponding to assembly 10 in FIG. 2 consisting of a hollow metal tube 212 on which is mounted collar 216 identical to collar 16 in FIG. 2. Mounted on flange 228 of collar 216 are the ends of jacket 236 and an outer tire casing 238. A groove 232 is located on the outer surface of flange 228 while a band 246 is utilized to tighten the ends of jacket 236 and casing 238 as previously described. Jacket 236 is able to retain air under pressure for one of the reasons given above. The construction is identical to the tires and assemblies shown in FIGS. 1-7.

Under some circumstances it may be desirable to simplify the assembly of a tire and assembly constructed in accordance with the principles of this invention.

Figure 9:
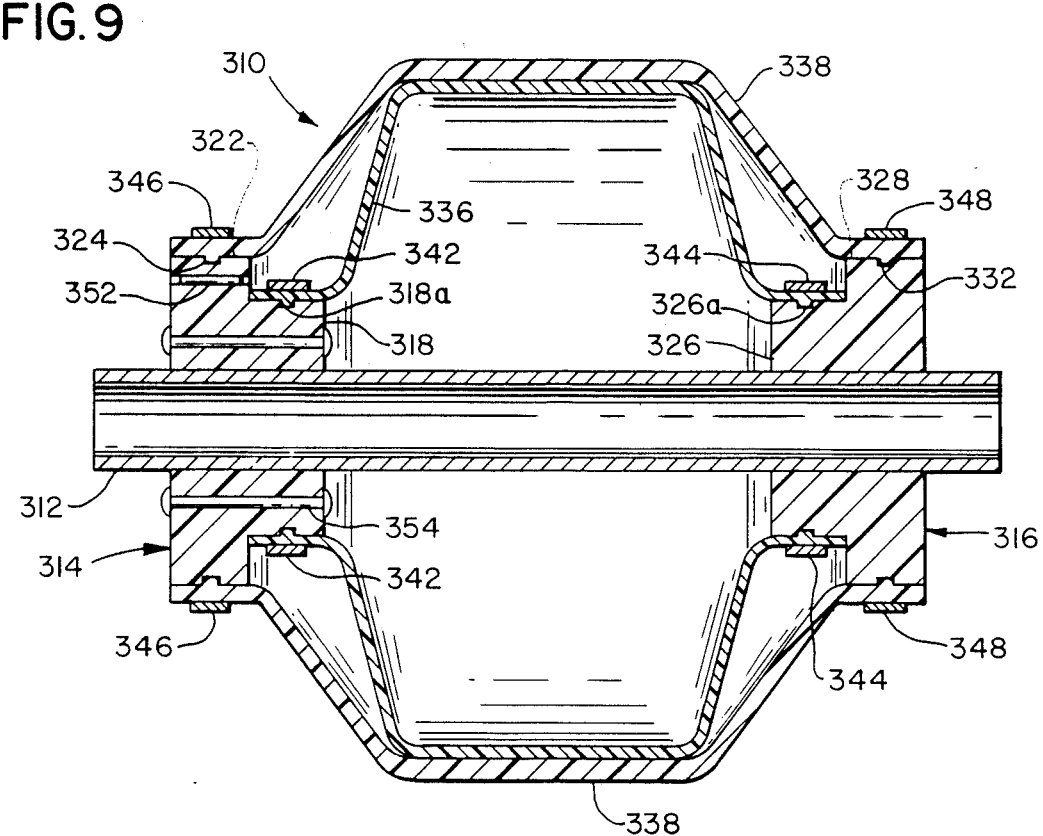
FIG. 9 is a section view similar to that of FIG. 2 showing another embodiment of this invention.

Such an embodiment is shown in FIG. 9 which illustrates assembly 310 consisting of a hollow metal hub 312 on which is mounted a pair of spaced collars 314 and 316 made of rubber or a rubber-like synthetic material. With assembly 310 symmetrical as illustrated, collars 314 and 316 are identical to but mirrors of each other. Hub 312 may be provided with internal bearings (not shown) to support an axle (not shown) and may have end caps (not shown) to function as hub caps.

Collar 314 is made of a sleeve 318 and a flange 322 of larger diameter having an annular groove 324 along the outer surface thereof as illustrated. Similarly, collar 316 has a sleeve 326 and a flange 328 with an annular groove 332. In addition, sleeves 318 and 326 are provided with similar grooves 324 and 332, respectively.

Extending between and over flanges 322 and 328 are two layers consisting of a jacket 336 and an outer tire casing 338.

Jacket 336 is any suitable flexible material such as woven or unwoven fabric, made of natural or synthetic fibers, a rubberized metal or fiberglass mesh, or similar material capable of forming into a predetermined shape when inflated. In addition, jacket 336 is made of material, is impregnated with a material, or coated with a material to render jacket 336 capable of containing air under pressure as it is inflated.

Outer tire casing 338 is a continuous sheet of rubber or synthetic rubber-like material having the physical characteristics to successfully carry out its function as a tire as previously described.

It will be noted that jacket 336 is spread over hub 312 with its ends resting on sleeves 318 and 326 of collars 314 and 316. Wrapped around sleeves 318 and 326 are bands 342 and 344 over grooves 318a and 326a, respectively, to be constructed and tightened as described in connection with the arrangement shown in FIGS. 1 and 2. In a similar fashion, tire casing 338 is tied to flanges 322 and 328 with straps 346 and 348.

A bleed opening 352 is provided through flange 322 to prevent air from being trapped between jacket 336 and casing 338.

One or more air valves 354 passing through sleeve 318 are provided to permit jacket 336 to be inflated.

In order to mount assembly 310, jacket 336 is first mounted using straps 342 and 344 followed by then mounting tire casing 328. The tire assembly 310 is inflated by supplying air under pressure through valve 354. This arrangement simplifies the manufacture of the tire assembly and makes it simpler to put together, especially when assembly 310 can be shipped knocked down so that it can be prepared for use in situ.

While only certain preferred embodiments of this invention have been described, it is understood that many variations may be made without departing from the principles of this invention as defined in the claims which follow.

What is claimed is:

1. A wheel and tire assembly for a vehicle comprising:
   a. means forming a cylindrical hub;
   b. a pair of spaced flanges mounted on said hub, each of said flanges including a cylindrical collar;
   c. an inner liner comprising a continuous sheet of inflatable material surrounding and extending between the collars of said flanges;
   d. jacket means surrounding said inner liner capable of taking a predetermined shape upon being expanded by the inflation of said continuous sheet;
   e. an outer tire casing means enclosing said jacket means for being expanded into the shape of said jacket means upon the latter being expanded by the inflation of said inner liner and thereafter functioning as a tire;
   f. sealing means mounted on each said collar to prevent air from escaping from within said inner liner;
   g. opening means in one of said flanges for permitting gas under pressure to be injected into said inner liner for inflation thereof;
   h. said sealing means comprising external bead means for retaining said inner liner, jacket means, and casing means on said flanges and preventing loss of air under pressure from said inner liner;
   i. said external bead means comprising straps for clamping the ends of said inner liner, jacket means and casing means on each said collar and;
   j. said opening means comprising a passageway to permit gas under pressure to be injected, said passageway being sealed closed by tightening the strap on the flange containing said passageway.

2. A wheel and tire assembly for a vehicle comprising:
   a. means forming a cylindrical hub;
   b. a pair of spaced flanges mounted on said hub, each of said flanges including a cylindrical collar having a first diameter and a sleeve of a smaller second diameter, the sleeve of each of said flanges facing each other;
   c. jacket means comprising a continuous sheet of inflatable material having a predetermined shape upon being inflated surrounding said hub and extending over the sleeves facing each other;
   d. an outer tire casing means enclosing said jacket means, forming a space therebetween, and extending over the cylindrical collar of each of the flanges for being expanded into the shape of said jacket means upon the jacket means being inflated;
   e. sealing means mounted on each said sleeve to prevent air from escaping from within said jacket means;
   f. means for clamping the ends of said tire casing means on each said collar; and
   g. means in one of said flanges for permitting gas under pressure to be injected into said jacket means for inflation thereof.

3. The wheel and tire assembly of claim 2 in which the width of said tire casing means to make contact with a riding surface is more than twice the diameter of said tire casing means.

4. The wheel and tire casing assembly of claim 3 having means to depressurize the space between said casing means and said jacket means.

* * * * *